Hedley Noel Western
INVENTOR

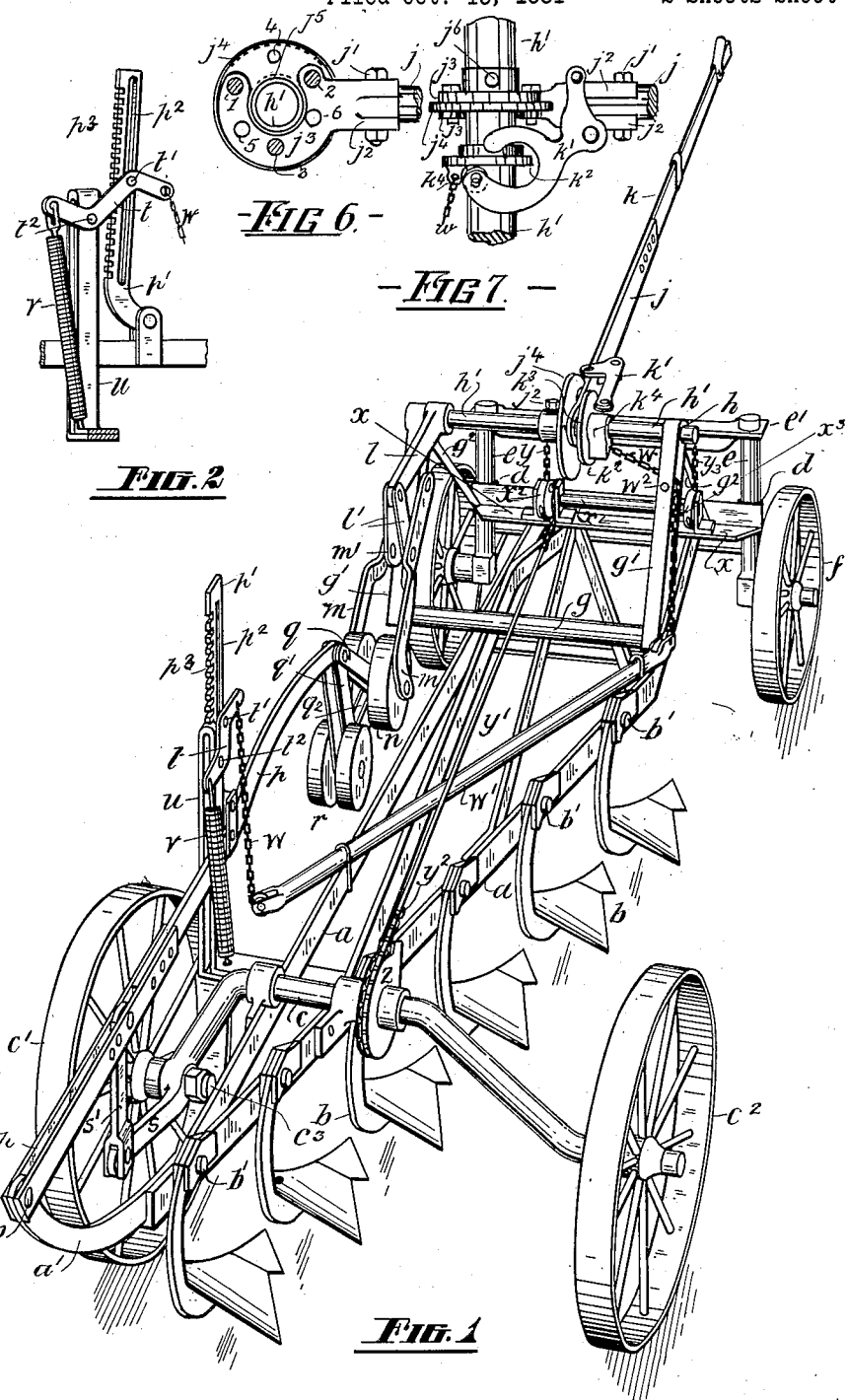

By [signature]
his Attorney.

Patented June 20, 1933

1,914,933

UNITED STATES PATENT OFFICE

HEDLEY NOEL WESTERN, OF MARION, SOUTH AUSTRALIA, AUSTRALIA

WHEELED PLOW

Application filed October 15, 1931, Serial No. 568,929, and in Australia November 15, 1930.

My invention relates to an improved lift for ploughs, cultivators and other agricultural implements such as disc ploughs, reaping and winnowing machines, wherein the body portion or frame requires to be elevated or depressed according to the nature of the work which is being carried out.

It may also be applied to other devices wherein the body is adapted to slide on vertical axles, and a crank axle is also provided to permit of a lifting and falling movement, but as a typical example I will describe my invention as applied to a multi-furrow four wheel plough of Australian type, wherein the rear axle is cranked and the inner frame is adapted to be elevated or depressed, and the front portion of the implement frame is supported upon two wheels having vertical axles or pillars upon which the front of the frame may be elevated.

A multi-furrow plough of this description is illustrated in the accompanying drawings wherein:—

Fig. 1 is a perspective view of a plough looking from the rear towards the front end thereof.

Fig. 2 is a detail of locking mechanism for maintaining the plough at various elevations.

Fig. 6 is a side view of a portion of reversible handle connections.

Fig. 7 is a plan of Fig. 6.

In each of the illustrations similar letters of reference are used to denote similar or corresponding parts wherever they occur.

Figure 3:
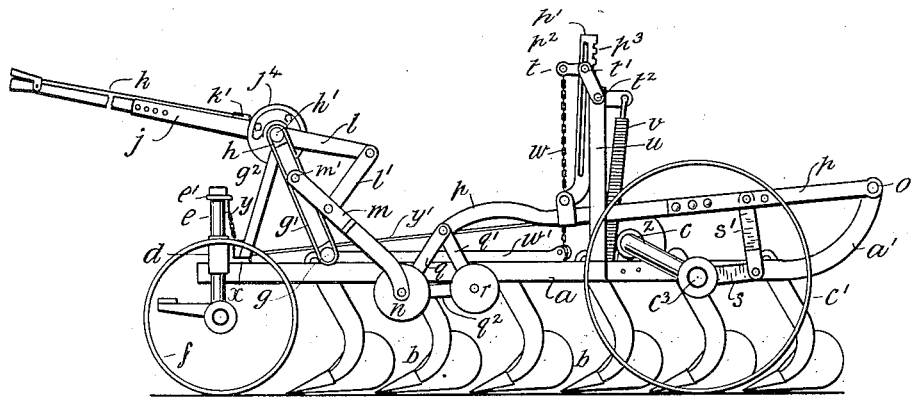
Fig. 3 is an outline side elevation of the implement showing the body raised and the shares above the ground.

In the drawings $a$ is the main frame having an upwardly extended rearward portion $a'$. The main frame supports the tynes and plough shares $b$, the tynes being preferably rotatably mounted on bolts $b'$. These tynes and shares are in common use and constitute no feature of novelty.

The main frame is supported at its rear end upon a main crank axle $c$ which is rotatably mounted on the frame and is provided with wheels $c'$ and $c2$. One of these wheels $c'$ (colloquially called the land wheel) is mounted upon a horizontal axle $c3$ which said axle passes through the crank portion of the axle $c$ and is rigidly attached thereto, or may be formed as an integral part thereof.

The front end of the plough frame is furnished with sliding sockets $d$ for the accommodation of the vertical axles $e$ upon which the front wheels $f$ are mounted, the lower end of the vertical axles being deflected outwardly at right angles to form a bearing for the front wheels.

The same general principles of my invention are applicable to various types with structural modifications to suit the type to which they are applied.

Above the frame and near the front end of the implement I secure a transverse bar $g$ which may be of round section and upon which upwardly extending supports $g'$ are rigidly fastened and are strengthened by stays $g2$ which are attached to the customary transverse angle iron forming the front of the frame.

At the top of these supports I mount a bearing $h$ for the transverse bar $h'$ which constitutes the axle for the operating lever. Upon this transverse axle $h'$ the hand lever mechanism is mounted and consists of a lifting lever $j$, the base of which may be of rounded section as in Figs. 6 and 7, and is rigidly attached to a pair of shank grips $j2$ which are arranged opposite to each other and each terminates in what may be called a three-quarter annular plate $j3$, the shanks being fastened to the handle by the bolts $j'$.

Between the disc-like ends of this attachment I provide a perforated disc $j4$ which is attached to a collar $j5$ which is mounted upon the transverse bolt $j6$. When the hand lever is mounted on the shaft these open discs are opposite or inverted to each other on each side of the perforated disc $j4$.

This device enables the position of the main lever handle $j$ to be easily reversed so that it may be controlled either from the seat of a tractor or from a seat near the rearward end of the plough.

This reversing operation is achieved by withdrawing the bolts from the bolt holes marked 1, 2, 3 in Fig. 6, reversing the position of the lever by radial movement, and re-inserting the disc bolts in the holes 4, 5 and 6.

Upon the lever arm I mount a locking and release device consisting of a trip lever $k$ which is mounted upon the lifting lever $j$ as illustrated, and operates a bell crank lever $k'$ which impinges upon the flange of a disc wheel $k2$ (Fig. 1) which is slidably mounted upon the rotatable transverse bar $h'$ and lies adjacent to the disc $j4$, there being a coil spring $k3$ between the two discs if so desired, so as to normally keep these discs apart, but the arrangement is such that when the trigger of the trip lever is depressed its free end forces the disc $k2$ inwardly towards the disc $j4$ through the action of the bell crank lever $k'$, and simultaneously exerts a pull on a link $k4$ which is attached to the sliding disc wheel $k2$ and to which a locking and release chain $w$, hereinafter mentioned, is fastened.

To the transverse bar $h'$ I secure the lever arm $l$, said arm being capable of being elevated or depressed by the lever handle $j$, acting through the bar $h'$, and this lever arm $l$ is provided with a link $l'$.

Upon the upwardly extending support $g'$ I arrange a bearing for the short weighted lever $m$, which rotates upon a central point $m'$, the lever arm $l$ being linked thereto by the link $l'$ as illustrated.

The lower end of the short weighted lever is suitably curved and is adapted to support a weight $n$ at its extremity. Referring now to the rearward end of the frame I construct a rigid upwardly extended portion $a'$ to which the long weighted lever $p$ is hinged by means of the pin $o$.

This lever $p$ extends forwardly to the vicinity of the short weighted lever $m$ and is preferably likewise suitably curved as illustrated, and terminates in a hinged connecting link $q$ whereby it is attached to the weighted end of the lever $m$, but the construction of these levers is such that the length of the lever $p$, plus the length of the lever $m$, exceeds in length the distance between the supporting points $m'$ of the short weighted lever and the pin $o$ of the long weighted lever, so that in their respective radial movements their ends intersect each other's path.

The hinge link extension $q$ forms the base of a triangle which may be built up by the short bars $q'$ and $q2$, or a substantially similar structure may be made in a single casting, but the formation is rigid, and the apex of the triangle so formed is weighted or carries a weight $r$. In a parallel lever frame construction as illustrated in Fig. 1, the weight may be duplicated as shown.

Upon an extension of the crank axle $c3$, or as an integral portion of the crank itself, I provide a rigid arm $s$ which moves in unison upwardly or downwardly as an extension of the back crank, and by means of a pivotally mounted connecting arm $s'$ transmits motion to the long weighted lever $p$ upon which I hinge the vertical locking bar $p'$ having a long slotted slideway $p2$ and a racked edge $p3$.

This slideway accommodates a pin $t'$ which projects from a small bell-crank lever $t$ which is supported by a pin $t2$ upon a vertical pillar $u$ which is rigidly mounted on the main frame $a$.

To the lower rearward member of the bell crank lever I attach a strong spring $v$ which keeps the forward end of the lever in a depressed position, and draws the notched edge of the locking bar $p'$ into engagement with the top of the pillar $u$ or to a catchment thereon, the lower end of the spring being attached to the frame.

To the upper and forward end of the bell crank lever I attach a connecting element such as a chain $w$ which extends downwardly and across the frame through a guide tube $w'$, its forward end being carried upwardly over a small pulley $w2$ (Fig. 1) and its extremity being attached to the link $k4$ which is associated with the trip lever mechanism and the sliding disc $k2$ previously described.

Upon the angle plate $x$ which constitutes a fixed portion of the lifting frame, I provide suitable bearings for the support of a small axle $x'$ (Fig. 1) upon which I mount grooved pulleys $x2$ and $x3$, and on the top front cross bar $e'$ of the frame to which the vertical axles $e$ of the front wheels are fastened I attach chains $y$ and $y3$. The chain $y$ passes round the grooved pulley $x2$ and has a rearwardly connecting rod or cable $y'$ which may terminate in a length of chain $y2$ (Fig. 1) which passes round a sheave $z$ which is rigidly fixed to the transverse straight portion of the crank axle $c$, and the chain $y3$ is attached to the pulley $x3$ which rotates in unison with the pulley $x2$, and when rotated winds or unwinds the short chain $y3$.

The operation of my device is as follows:—

Assume that the implement is in the position illustrated in Fig. 3 with the shares above the ground and it is desired to lower the shares into the soil. The operator seizes the handle of the lever $j$ and presses the trigger of the locking lever $k$. This latter action operates the bell crank $k'$ and causes the disc $k2$ to compress the coil spring $k3$ against the disc $j4$.

Simultaneously the link $k4$ pulls the chain $w$, thus operating the bell crank lever $t$ on the pillar $u$ at the opposite end of the chain. The radial movement of the bell crank $t$, acting through the pin t', draws the slotted locking bar p' forward away from the pillar, thus releasing its notched edge p3, out of engagement with the top of the pillar u as indicated in Fig. 2, and the almost simultaneously applied downward movement of the main lever j rotates the transverse bar h'. This rotation of the transverse bar unwinds the frame supporting chains y and y3 through the medium of the rotating axle x and the grooved wheels x2 and x3 attached thereto, so that the front part of the frame of the implement is free to slide downwards.

As a further simultaneous movement of the associated levers m and p and their connecting parts, the depression of the handle which causes the partial rotation of the crank axle c, correspondingly causes a partial rotation of the sheave z on the crank axle, and to which the chain extension y2 is attached, and the chain y and its extension which passes round the pulley x2 is consequently unwound and results in allowing the whole of the frame to simultaneously gravitate towards the earth.

It will of course be understood that if the handle is structurally arranged in a rearward position the handle must be elevated to achieve the movements above described instead of being depressed.

Figure 4:
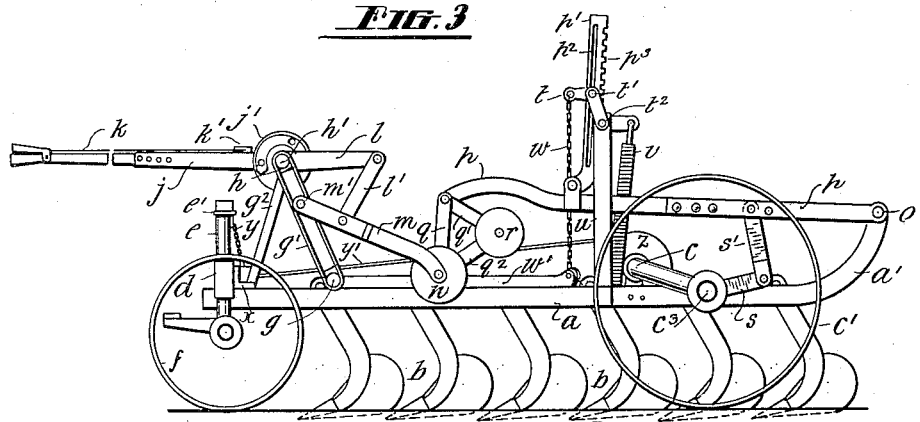
Fig. 4 is a side elevation of the implement showing the shares approximately on a level with the ground as in skim ploughing, the frame having been partially lowered.
Figure 5:
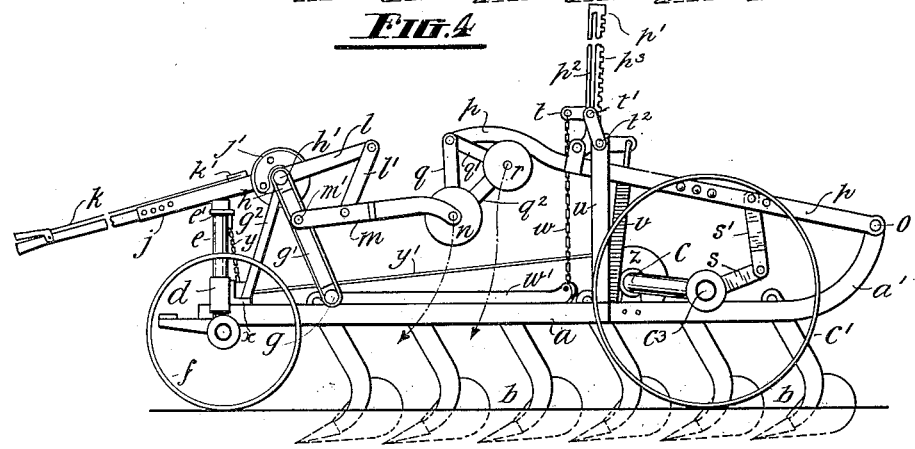
Fig. 5 is a side elevation of the plough showing the frame in a depressed position and the shares penetrating the ground as in deep soil ploughing.

The plough will then assume the position shown in Fig. 4 for surface ploughing, and the further movement of the lever handle results in adjusting the implement for deep soil ploughing as in Fig. 5, the plough being easily returned to its normal position by the reverse movement of the lever handle j, the body being maintained in a horizontal position throughout the operation.

During these movements the inner ends of the levers m and p will cross each other's path, and will result in changing the position of the weights to the position shown in the illustrations, Figs. 3 to 5.

It will be seen that when the shares are in the ground the weights are well elevated and are exerting their influence through the levers mainly on the left hand back wheel.

This helps to keep the plough on a straight course and prevents it from side tracking, but when the position of the lever handle is reversed the lowering of the weights transfers the influence of the leverage towards the front wheels of the plough, and counterbalances the weight of the frame and the effect of the draft, and materially assists the labour of lifting the shares from the ground.

What I claim is:—

1. A lift for ploughs and the like, comprising an implement carrying frame, vertically adjustable wheels carried by the frame, means for raising and lowering the frame including a pair of levers of unequal length pivotally mounted on the frame, the total length of the two levers being greater than the distance between their pivotal points and their free ends overlapping and intersecting each other's path, a link joining the free ends of said levers, weights carried by said levers, means connecting the wheels to the levers and means for adjusting the relative positions of the levers to impart vertical movement to the frame.

2. A lift for ploughs and the like, comprising an implement carrying frame, vertically adjustable wheels carried by the frame, means for raising and lowering the frame including a pair of levers of unequal length pivotally mounted on the frame, the total length of the two levers being greater than the distance between their pivotal points and their free ends overlapping and intersecting each other's path, a link joining the free ends of the levers, a weighted frame interposed between and connecting the free ends of the levers, means connecting the wheels to the levers and means for adjusting the relative positions of the levers to impart vertical movement to the frame.

3. A lift for ploughs and the like, comprising an implement carrying frame, vertically adjustable wheels carried by the frame, means for raising and lowering the frame including a pair of levers of unequal length, the total length pivotally mounted on the frame of the two levers being greater than the distance between their pivotal points and the free ends overlapping and intersecting each other's path, a triangular frame interconnecting the free ends of said levers, weights at certain corners of said triangular frame, means connecting the wheels to the levers and means for adjusting the relative positions of the levers to impart vertical movement to the frame.

4. A lift for ploughs and the like, comprising an implement carrying frame, vertically adjustable wheels carried by the frame, means for raising and lowering the frame including a pair of levers the free ends of which overlap, a link joining said overlapping ends, a weight at the junction of one of the levers with said link, a second weight offset from the plane of said link, means connecting said wheels to the levers and means for adjusting the relative positions of the levers to impart vertical movement to the frame.

5. A lift for ploughs and the like, comprising an implement carrying frame, vertically adjustable wheels carried by the frame, means for raising and lowering the frame including a pair of levers the free ends of which overlap, a rigid triangular frame with its base interconnecting said overlapping ends of the levers, a weight at one corner of said base, a second weight at the apex of said triangular frame, means connecting the wheels to said levers and means for adjusting the relative positions of the levers to impart vertical movement to the frame.

6. A lift for ploughs and the like, comprising an implement carrying frame, a rotatable shaft supported adjacent one end thereof, a crank axle supported adjacent the other end of the frame, a relatively short weighted lever pivotally mounted on the frame and projecting rearwardly of the plough, means connecting one end of said lever to said rotatable shaft, a relatively long weighted lever pivotally mounted on the frame and projecting forwardly of the plough, means connecting one end of said last mentioned lever to said crank axle, means interconnecting the adjacent ends of both said levers, a connection from said rotatable shaft to said crank axle and means for rotating said shaft to move the frame and actuate said levers.

7. A lift for ploughs and the like, comprising the combination with the elements claimed in claim 6, of a lifting pillar carried by the implement carrying frame and a pivotally mounted locking member carried by said relatively long lever, said locking member movable into and out of engagement with said pillar.

8. A lift for ploughs and the like, comprising an implement carrying frame, a pair of levers pivotally supported at the front and rear, respectively, of said frame, means for actuating said levers, and lever locking and releasing means including a fixed pillar secured to said frame, a longitudinally slotted rack pivotally mounted on one of said levers in proximity to said pillar and a spring controlled bell crank mounted on the pillar and having a pin projecting into the slot in said rack.

9. A lift for ploughs and the like, comprising the combination with the elements claimed in claim 6, of lever locking and releasing means including a fixed pillar secured to the implement carrying frame in proximity to said crank axle, a longitudinally slotted locking bar pivotally mounted on the relatively long lever in proximity to said pillar, said locking bar having teeth on the edge thereof facing the pillar, a spring controlled bell crank mounted on the pillar and having a pin projecting into the slot in said rack, and means for exerting a pull on the bell crank in opposition to the pull of said spring.

10. A lift for ploughs and the like, comprising an implement carrying frame, a rotatable shaft adjacent one end of said frame, a lever system pivotally connected with said frame, a collar secured to said shaft, a disc attached to said collar and having a plurality of perforations therein, a reversible lever comprising a lever handle and separable attachment members secured thereto and a three-quarter disc plate secured to each said attachment member, said disc plates having bolt holes adapted to register with said perforations when said lever handle is in either a forward or rearward position, and means for operating the lever system from the lever handle.

In testimony whereof I have affixed my signature.

HEDLEY NOEL WESTERN.